United States Patent [19]

Watanabe et al.

[11] Patent Number: 5,028,123
[45] Date of Patent: Jul. 2, 1991

[54] FOCAL-LENGTH ADJUSTING ASSEMBLY FOR BINOCULARS

[75] Inventors: Naomi Watanabe; Akihiro Shimofuruta, both of Tukagoshi, Japan

[73] Assignee: Kamakura Koki Co., Ltd., Warabi, Japan

[21] Appl. No.: 373,439

[22] Filed: Jun. 30, 1989

[30] Foreign Application Priority Data

Jul. 4, 1988 [JP] Japan .......................... 63-88897[U]

[51] Int. Cl.⁵ .............................................. G02B 23/00
[52] U.S. Cl. .................................... 350/556; 350/552
[58] Field of Search ............... 350/545, 550, 551, 552, 350/555, 556, 563

[56] References Cited

U.S. PATENT DOCUMENTS

4,428,651  1/1984  Calcutt ............................. 350/556
4,818,086  4/1989  Moore .............................. 350/552

Primary Examiner—Bruce Y. Arnold
Assistant Examiner—James Phan
Attorney, Agent, or Firm—Edwin E. Greigg; Ronald E. Greigg

[57] ABSTRACT

The present invention relates to a focal-length adjusting assembly for a pair of binoculars which adjusts the eyepieces relative to the optics and which can hold the adjusting screw or rod in a click-stopped position which automatically positions the eyepieces in a position for viewing an object at an infinite distance.

13 Claims, 9 Drawing Sheets

FOCAL-LENGTH ADJUSTING ASSEMBLY FOR BINOCULARS

BACKGROUND OF THE INVENTION

This invention relates to a focal length adjusting assembly for binoculars which adjusts and holds a central focusing rod in a click-stop position for automatically holding the eye pieces in a position for viewing an object at an infinite distance up to now, apparatus in which the ocular adjusting mechanism is moved by rotation of a manipulating lever or by adjusting of a dial-like manipulating lever have been used as visual regulators. However, in those apparatus the distance adjusting mechanism cannot be held at a position for viewing an object at an infinite distance because the manipulating lever and adjusting dial can be freely rotated.

Accordingly, the focal lengths in the prior art adjusting devices have been easily changeable and could not be held at the position for viewing an object at an infinite distance. Therefore, the focal lengths had to be frequently adjusted for use. Furthermore, the prior art adjusting devices could not be adjusted to and held at the position for viewing an object at an infinite data.

SUMMARY OF THE INVENTION

It is a principle object of this invention to provide a focusing regulatory apparatus on binoculars which can certainly prevent any change in a focal length by click-stopping the adjusting rod automatically at a position when adjusted for viewing an object at an infinite distance and it can be easily used with such position as well as at other focal lengths.

It is another object of this invention to provide a focal length regulatory apparatus which can be easily used for setting a focal length at any discretionary position using a holding assembly.

The above and further objects and novel features of the invention will more fully appear from the following detailed description when the same is read in connection with the accompanying drawing. It is to be expressly understood, however, that the drawing is for purposes of illustration only and is not intended as a definition of the limits of the claimed invention.

DESCRIPTION OF THE PREFERRED EMBODIMENT

This invention will be described in detail hereinafter with reference to the embodiments shown in the different figures.

Referring first to the embodiment shown in FIGS. 1-4 inclusive, 1 and IA indicate right and left telescopes including well-known prisms or mirrors fixed relative to each other in which right and left eyepiece lenses 2 and 2A are installed, respectively. The eyepieces and barrel can be adjusted for any focal length by adjusting the distance between the eyepieces and the other optical elements. Also, at least one of the eyepieces is adjustable on the barrel for better overall adjustment. The binoculars include a focal-length regulatory apparatus 3 by which the right and left eyepiece lenses 2 and 2A of the right and left telescopes 1 and IA are adjusted for a proper focal length. This focallength regulatory apparatus 3 is composed of a tubular central shaft 6, an axially aligned, central, rotatable focal-point adjusting rod 7, an eyepiece lens-supporting apparatus 8, a rotatable tubular adjusting mechanism 9, an adjusting apparatus 10, and a click-stop apparatus 11. The central shaft 6 supports rotatably, adjustable eye-width adjusting pieces 4, 5 that protrude from the upper and lower housing wall of the right telescope 1; and eye width adjusting pieces 4A, 5A protrude from the upper and lower housing wall of the left telescope 1A, respectively.

The main focal-point adjusting rod 7 is shiftably installed in and supported by the central shaft 6. The eyepiece supporting apparatus 8 includes two support pieces 25 and 25A. One end of each piece is rotatable about a right and left eyepiece support 20 secured to the outer end of the focal-point adjusting rod 7 and have outer ends secured to the right and left eyepieces. The adjusting mechanism 9 is rotatably secured on the outer wall of the central shaft 6. The focal-point adjusting rod 7 will be identified as a focusing rod 7 hereafter. The adjusting apparatus 10 moves the focusing rod 7 by rotation of the adjusting mechanism 9. The click-stop apparatus click-stops the movement of the focal-point adjusting rod 7 at the optical focal position of infinite distance.

The central shaft 6 comprises a tubular central portion 12, an outer end flange 13, an enlarged diameter restricted ring-supporting piece 14 extending from the flange 13, and a shaft securing screw 17 at its opposite end. The outer end flange 13 is constituted on the end of central portion 12 of the central shaft 6 toward the eyepieces 2 and 2A, and is in contact with the supporting piece 4A of the right telescope 1. The restricted ring-supporting piece 14 is constituted protrudently on the outer wall of the flange 13. The shaft securing screw 17 is provided with a threaded head 16 on which an end cap 15 is threaded The end cap 15 is in contact with the eye width adjusting piece 5 that protrudes from the telescope 1 and is rotatable about the end of the central portion 12 of the central shaft 6. The focusing rod 7 comprises a main body portion 18 which is shiftably installed within the central shaft 6, and the right and left eyepiece lens support 20 is fixed to the outer end of the main body 18 of the adjusting rod 7 with a screw 19. This right and left eyepiece lens-support 20 comprises a small diameter protrusion 22, a flange 23, and a tubular bearing part 24. The small diameter protrusion 22 is inlaid in blind bore 21 which is formed in the outer end of the main body portion 18 of focusing rod 7. The right and left eyepiece lens supports are formed as a single piece which includes the protrusion 22, the flange 23, and the tubular bearing part 24. The tubular bearing part 24 includes an axially threaded blind bore 26.

The eyepiece lens-support apparatus 8 comprises the two supporting pieces 25 and 25A. A screw 27 is threaded into the blind bore 26 to secure the support pieces 25 and 25A in place and an end cap 29 is secured to the screw 27 by a screw 28. The outer ends of support pieces 25 and 25A are fixed to the eyepieces 2 and 2A and the inner ends of the supports 25 and 25A surround the tubular bearing part 24 and are rotatable about the bearing part 24. Thus, the right and left eyepieces are supported by the support 20 which is secured to the outer end of focusing rod 7 by the support 20. The screw 27 secured to the bearing part 24 prevents the supports 25 and 25A from falling off and the end cap 29 is fixed to the screw 27 with a screw 28.

The focusing shaft adjusting mechanism 9 is located between the upper support pieces 4, 4A and 5, 5A of the right and left telescope 1 and 1A, respectively. The focusing shaft adjusting mechanism 9 includes an aperture 30 which receives the central shaft 6. A serration 31 is formed in the outer surface of focusing shaft adjusting mechanism 9 to prevent slipping.

The adjusting apparatus 10 comprises a spiral groove 32 formed in the inner wall of the focusing adjusting mechanism 9, a linear slot 33 is formed in the central shaft 6 and a screw 34 is threaded into a bore of focusing rod 7. The screw 34 includes a head that rides within the spiral groove 32 in focusing rod 7 and the screw slides along the linear slot 33 in the central shaft 6 as the focusing rod 7 moves for adjusting the focal point.

The click-stop apparatus 11 comprises a ring-spring frame 35 that includes an annular groove 36, a ring-spring 37, a set-screw 38, and a concave annular groove 39 in the focusing rod 7. The spring ring frame 35 is installed in the confines of a restricted ring-supporting piece 14 such that the annular groove 36 encompasses the ring-spring 37 installed in the ring-spring receiving annular groove 36 which is formed in the outer wall of the focusing rod 7. The set screw 38 fixes, at a certain position, the ring-spring 35 within the restricted ring-supporting piece 14. The annular groove 39 is a V-like concave, annular, groove into which the ring-spring 37 drops when the focusing rod 7 is moved to a position for viewing an object at an infinite distance by movement of the rod by rotation of the focusing adjusting mechanism 9.

The reference character 40 designates a restricted ring which covers the ring-spring 35, etc. installed in the restricted ring-supporting piece 14 and which inhibits an excessive movement of the focusing rod 7.

In a binocular 41 arranged as described, the screw 34 can be moved along the spiral groove 32 formed in the adjusting mechanism 9 by rotation of the adjusting mechanism 9; simultaneously, the focusing rod 7 is also moved axially by movement of the screw 34 along the axially aligned slot 33 in central shaft 6.

Therefore, the right and left eyepiece lenses 2 and 2A are moved as the eyepiece lens supporting apparatus is moved with the focusing rod 7 so that the focal length is changed for a clear, visual view of the object to be viewed.

Figure 1:
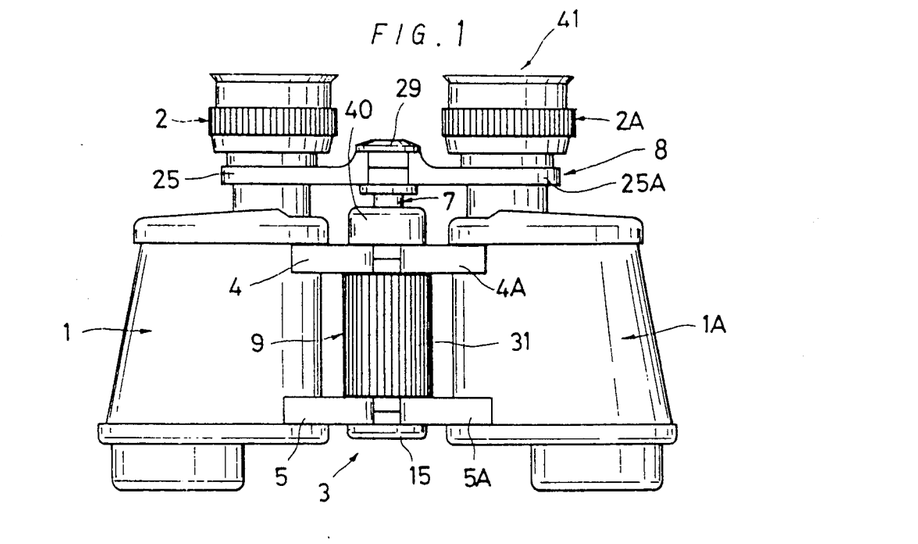
FIG. 1 is a perspective view showing an embodiment of this invention.
Figure 2:
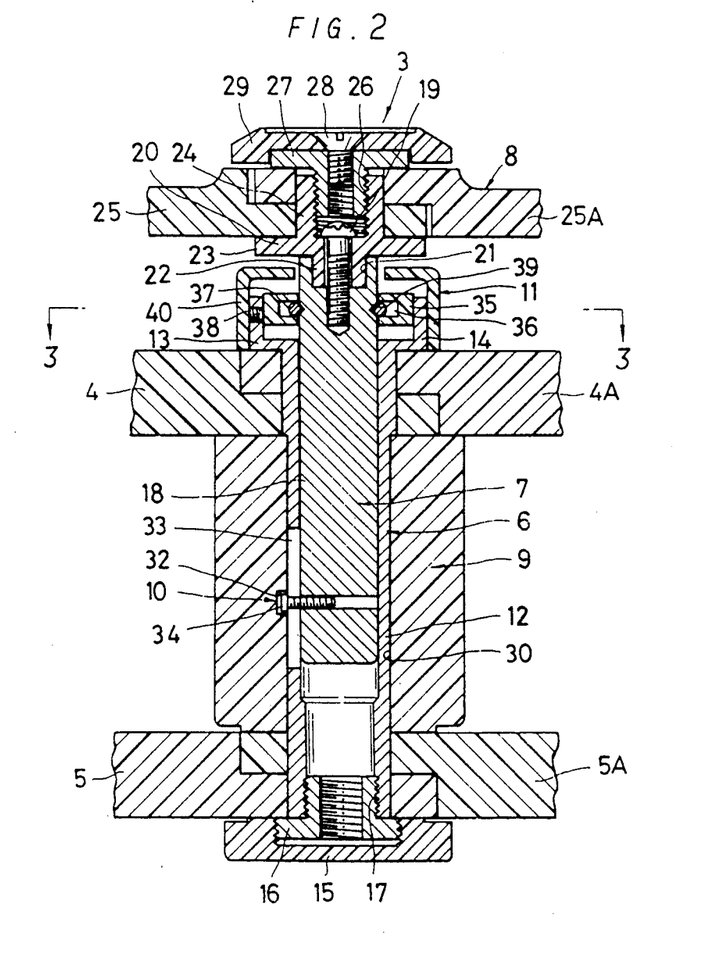
FIG. 2 is a partial longitudinal cross-sectional view of the focal length adjusting assembly shown in the embodiment of FIG. 1.
Figure 3:
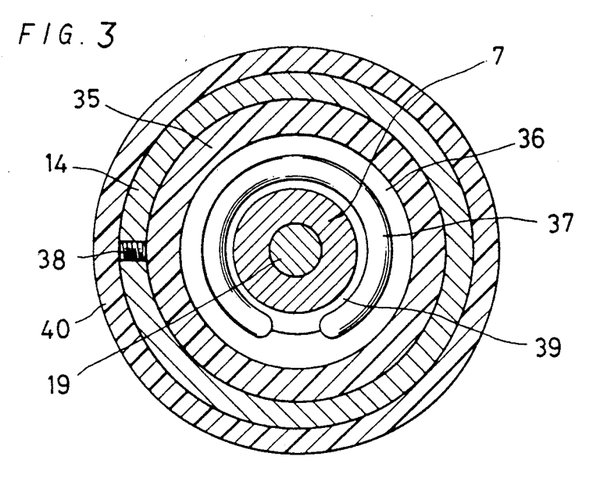
FIG. 3 is a cross-sectional view of the click-stop assembly taken on line 3—3 of FIG. 2.
Figure 4:
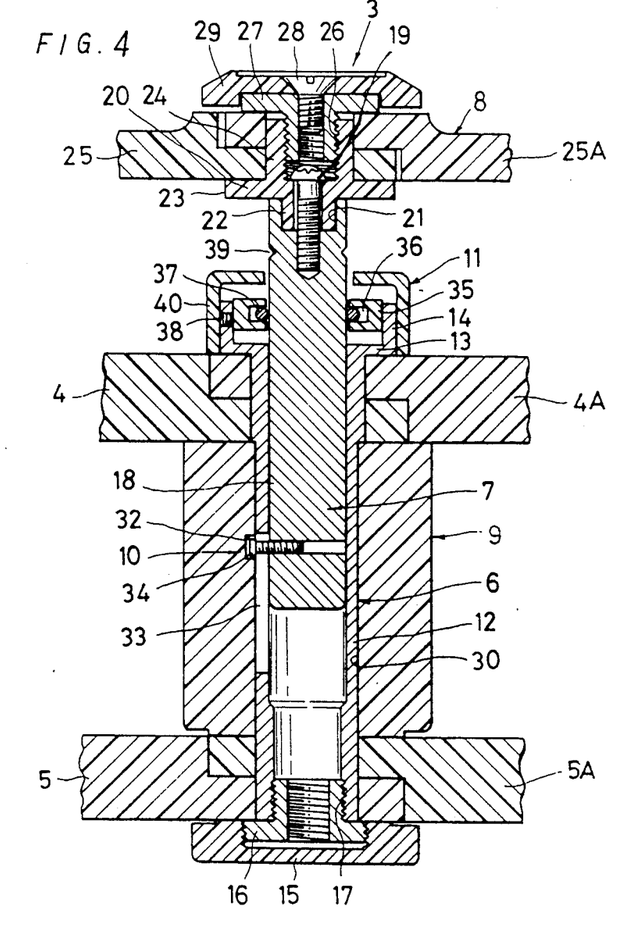
FIG. 4 is a cross-sectional view of the focal length adjusting assembly of FIG. 2 shown for viewing an object at an infinite distance.

Furthermore, the focusing rod 7 can be click-stopped at the position for viewing an object at an infinite distance where the ring-spring 37 drops into the concave annular groove 39 formed in the focusing rod 7, as shown in FIG. 2.

In addition, in case of a release of the click-stop 11, a rotation of the adjusting mechanism 9 by slightly more power can make the ring-spring 39 release from the concave groove 39 in the focusing rod 7 and the focusing rod 7 can be moved freely for a clear view setting less than at an infinite distance.

DIFFERENT EMBODIMENTS OF THE INVENTION

Now the different embodiments of this invention shown in FIGS. 5-18, inclusive, will be described. Further, in the description of these embodiments, duplicate components identical to components previously described will be given identical reference characters.

Figure 5:
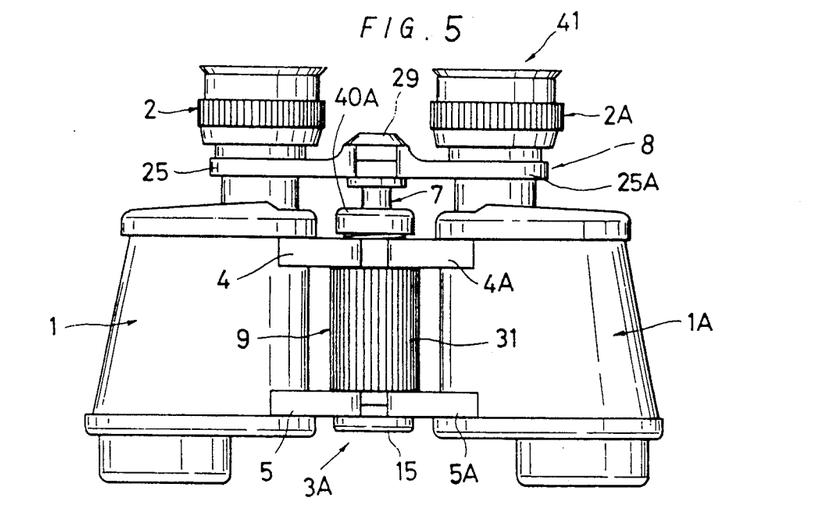
FIGS. 5 and 6, FIGS. 7 and 8, FIGS. 9 and 10, FIGS. 11 and 12, FIGS. 13 and 14, and FIG. 15-18 inclusive are explanatory views showing different embodiments of this invention, respectively.
Figure 6:
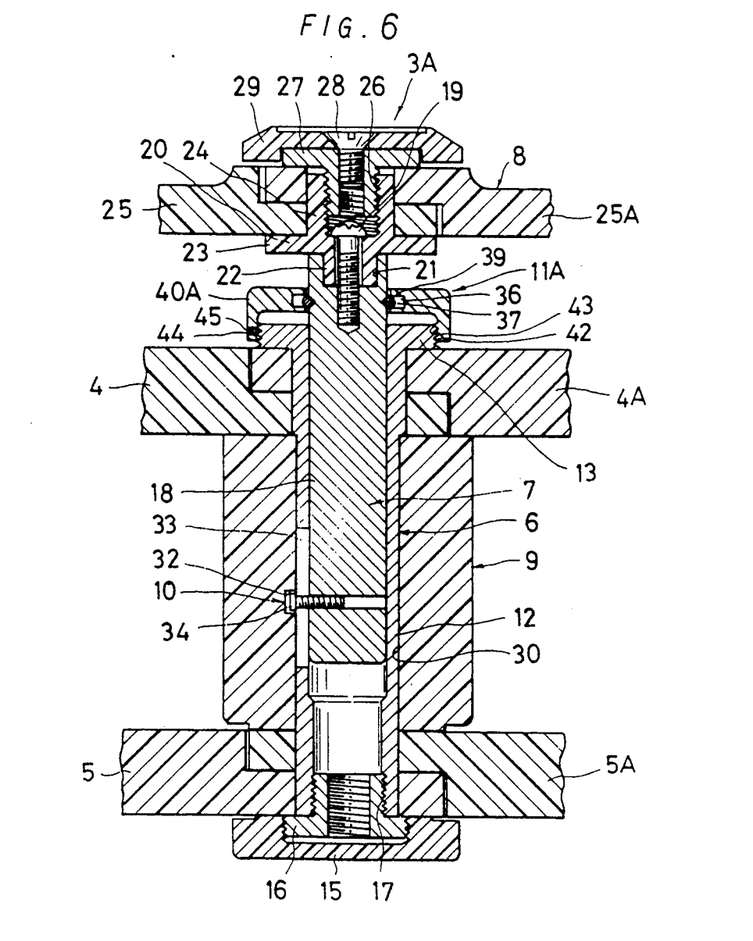

In the embodiment shown in FIGS. 5 and 6, the significant difference from the embodiment of FIGS. 1-4 is in a click-stop apparatus 11A. This click-stop apparatus 11A comprises a V-like, concave, annular, groove 39 which is formed in the outer wall of the outer end of focusing rod 7 and a ring-spring 37 as a connecting piece installed in a ring-spring groove 36 which is formed on the inner wall of the restricted ring 40A. It will be appreciated that it is possible to obtain the same effect as set forth above even in case of the click-stop apparatus 11A arranged as described.

Further, a screw thread 43 is formed on an inner wall of the restricted ring 40A in accordance with a screw thread 42 which is formed on the outer part 13 of the central shaft 6, and a setting screw hole 45 is formed in the restricted ring 40A to install a setting screw 44 for regulatory fixation of the restricted ring 40A.

Figure 7:
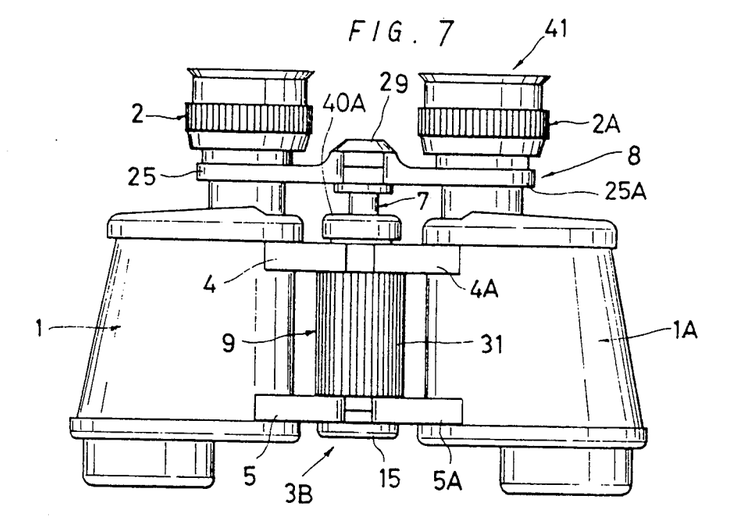
Figure 8:
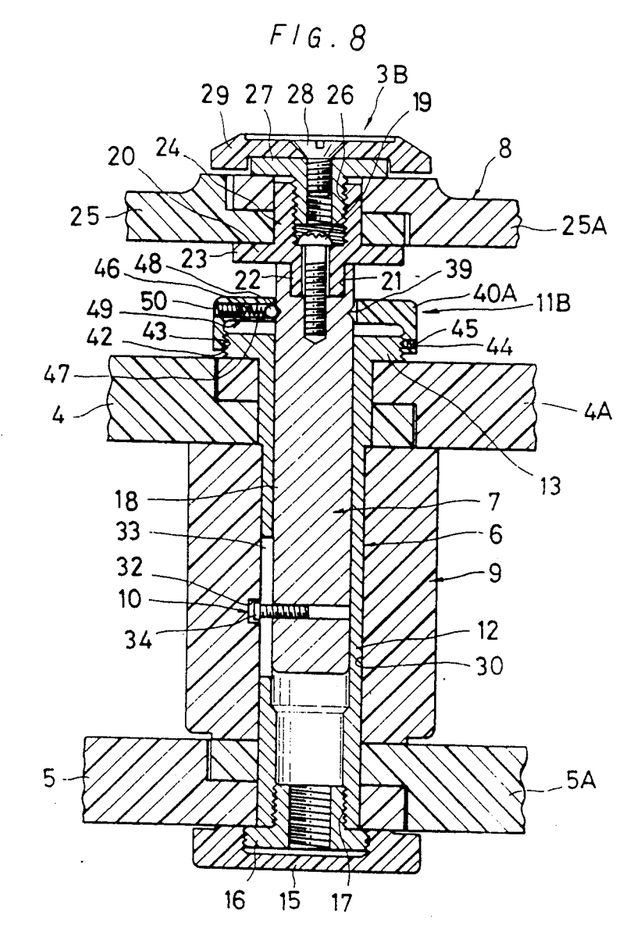

In the embodiment shown in FIGS. 7 and 8, the significant difference from the above described embodiments of this invention is in the click-stop apparatus 11B. This click-stop apparatus 11B comprises a V-like concave, annular, groove 39 which is formed on the outer wall of the focusing rod 7 and a connecting piece 49 which is composed of a coil-spring 47 contained in an insertion hole 46 formed on the inner wall of the restricted ring 40A, and a ball 48 which is added to be inserted into the concave annular groove 39 by the coil spring 47. It will be appreciated that it is possible to obtain the same effect of the click-stop apparatus 11B arranged as described.

Further, a set screw 50 is provided for adjusting the spring force of the spring 47 in the insertion hole 46. The same effect can be obtained by use of a connecting pin having an end which is formed like an arc or cone shape instead of the ball 48, as a connecting piece 49.

Figure 9:
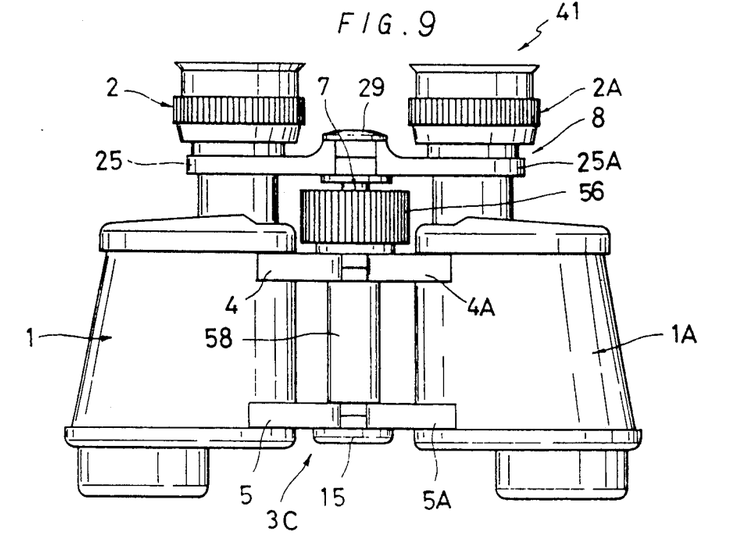
Figure 10:
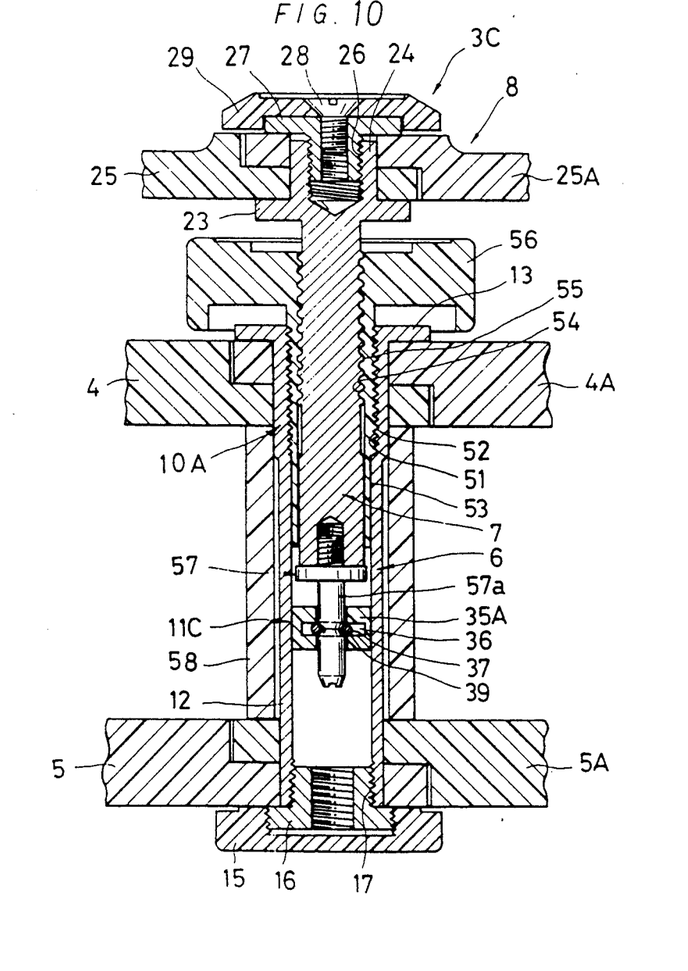

In the embodiment shown in FIGS. 9 and 10, the significant different from the embodiments of this invention described above is that a focus adjusting apparatus 10A comprises a small-pitched screw thread 51 formed on the inner wall of the central shaft 6, a screw pipe 53 with screw threads 52 formed on the outer part thereof that correspond with the screw threads 51, large-pitched screw threads 54 formed on the inner wall of the screw pipe 53, a screw thread 55 formed on the outer surface of the focusing rod 7 that corresponds to the screw threads 54, and a dial-like manipulating wheel 56 integrally formed with the screw pipe 53 which adjusts focusing rod 7 for different settings. Another significant difference from the above-described embodiments is that click-stop apparatus 11C is composed of a V-like concave annular groove 39 formed on the outer wall 57a of a restricted screw attachment 57 which is fixed correspondingly in the inner end of focusing rod 7, and a ring-spring 37 as a connecting piece which is connected with the concave annular groove 39 held in the ring-spring groove 36 on the inner wall of a ring-spring frame 35A fixed on the inner wall of the central shaft 6. It will be appreciated that it is possible to obtain the same effect as set forth above, even in case of an infinite position regulatory apparatus 3C, using the apparatus 10A and the click-stop apparatus 11C arranged as described. Since the wheel 56 adjusts the focusing rod, the focus adjusting mechanism 9 is replaced by a pipe-like support 58 installed between the support pieces 4, 4A and 5, 5A.

Further, having described the invention as related to the embodiment shown in FIGS. 9 and 10, it is our intention that the same adjusting effect as set forth above may be obtained.

Figure 11:
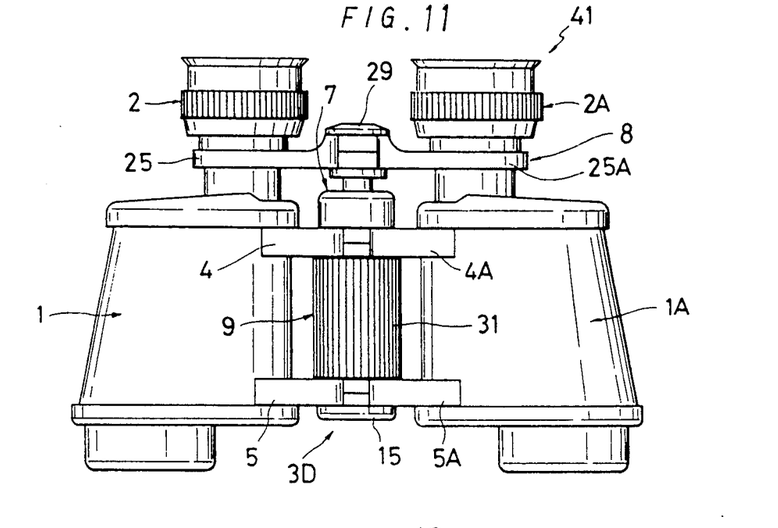
Figure 12:
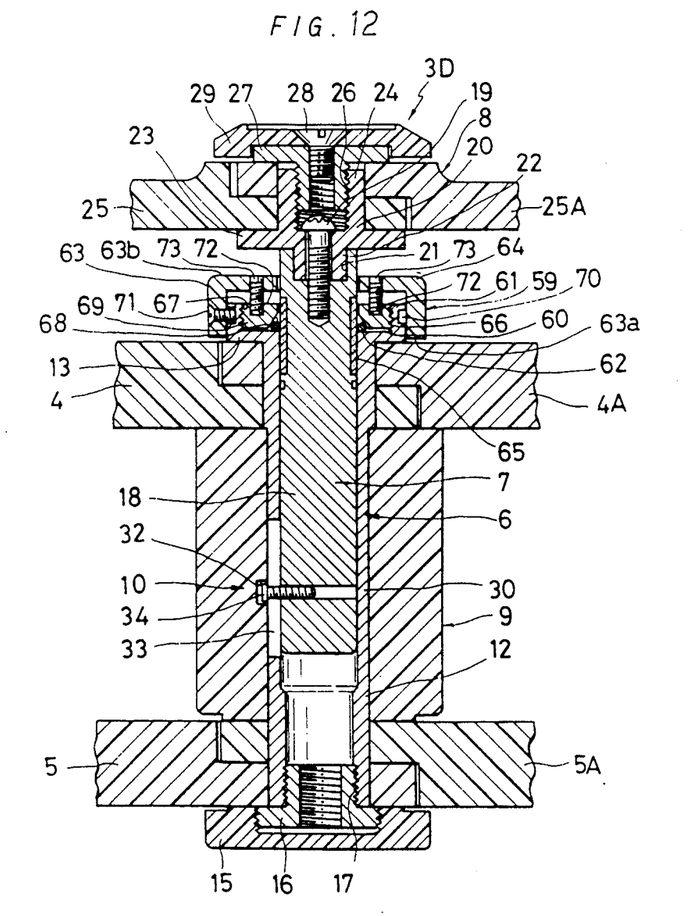

In the embodiment shown in FIGS. 11 and 12, the significant difference from the embodiments set forth above is an infinite distance regulatory apparatus (6K) 3D in which a focusing rod stop apparatus 59 is described. The focusing rod stop apparatus 59 comprises a stop-ring holding piece 61, a ring spring 62, a stop-ring apparatus 64, and a non-slip sheet 65. The stop-ring holding piece 61 can form a spacing 60 between the outer part of the central shaft 6 and the focusing rod 7. Ring-spring 6 is installed in the spacing 60 between the stop-ring holding piece 61 and the focusing rod 7 to inhibit the movement of the focusing rod 7. Stop-ring apparatus 64 includes a stop-ring 63 which can inhibit the movement of the focusing rod 7 by use of the ring spring 62 installed rotatably to the stop-ring holding piece 61. Non-slip sheet 65 is a rubber sheet or similar material fixed on the outer wall surface of focusing rod 7 which the ring-spring contacts. The stop lever ring apparatus 64 comprises a stop-ring 69 with a screw thread 66 on its inner surface, a spring-pressing ring 69, a stop-ring 63, a restricted screw 71 which extends into an annular groove 70 in the outer surface of the spring pressing ring 69, and linkage pins 73 which extend into a blind bore 72 in a face end of the spring pressing ring 69. Screw threads 66 are formed on the inner wall of the stop ring holding piece 61 and corresponding screw threads 67 are formed on the outer surface of spring pressure ring 69. A slant face 68 is formed in ring 69 contracted against spring 62 by rotation of ring 69 which threads screw threads 67 into corresponding screw threads 66. Stop-ring 63 is rotatably secured relative to the stop ring holding piece 61 by use of screws 71 which extend into a ringlike corresponding annular groove 70 formed on the outer wall of the stop ring holding piece 61 which is fixed to the flange 13. The linkage pins 73 are installed on an outer wall 63b of the stop-ring 63 and have an end inserted in a linkage blind bore or pin hole 72 which is formed in the spring pressuring ring 69.

Therefore, the spring pressing ring 69 can be rotated through rotation of stop ring 63 via the linkage pins 73. During rotation of the stop ring 69, this stop ring 69 is screw threaded relative to the corresponding screw threads 66 of the stopping ring holding piece 6i so that an inward movement will lock the ring spring against the non-slip sheet 65.

Therefore, a movement of the focusing rod 7 can be stopped by contraction of the ring spring 62 by the slant face 68 of the spring pressing ring 69 which applies a pressure on the non-slip sheet 65 of the focusing rod 7.

The ring spring 62 can be relaxed by reverse movement of the spring pressing ring 69 through a reverse rotation of the ring 69.

A visual focusing regulatory apparatus 3D can be used at any optional position of the focusing rod 7 by use of the focusing rod fixing apparatus 59.

Figure 13:
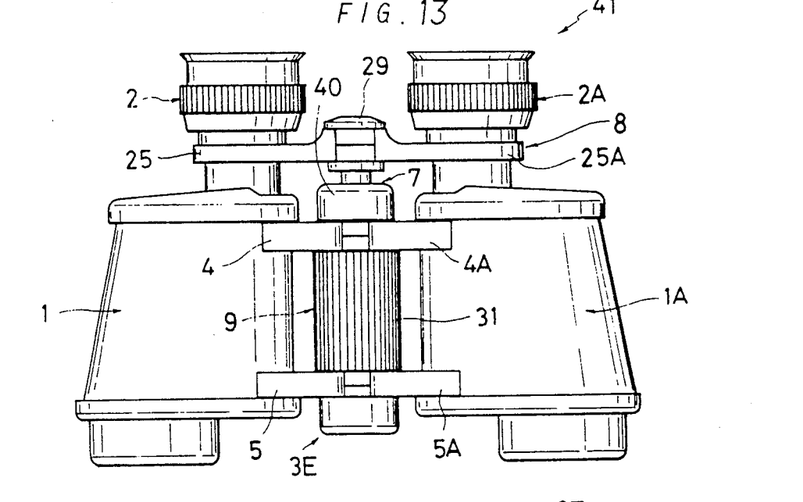
Figure 14:
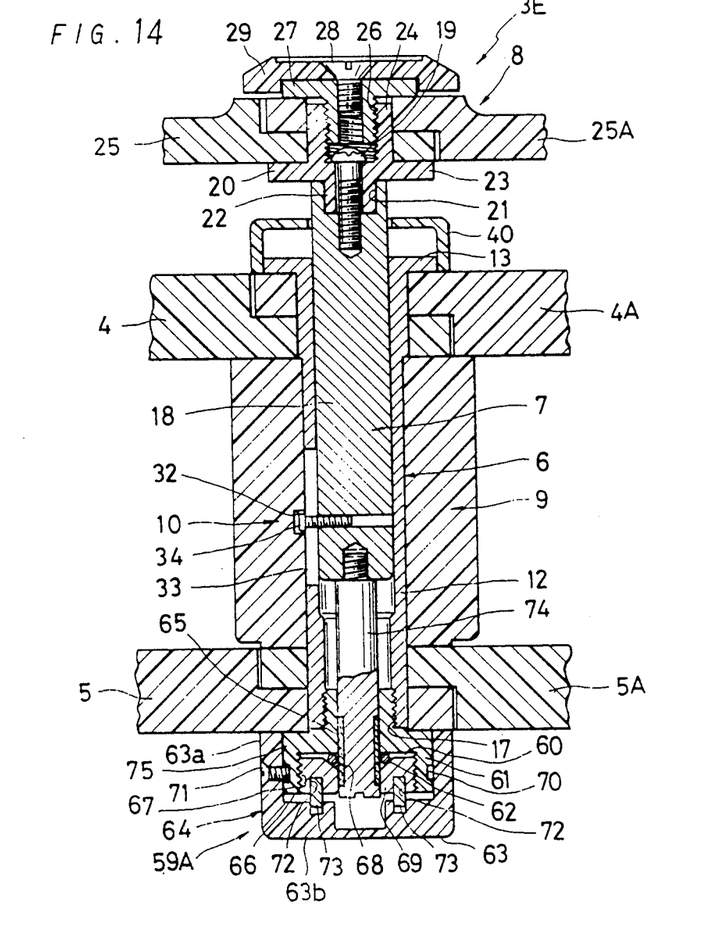
Figure 15:
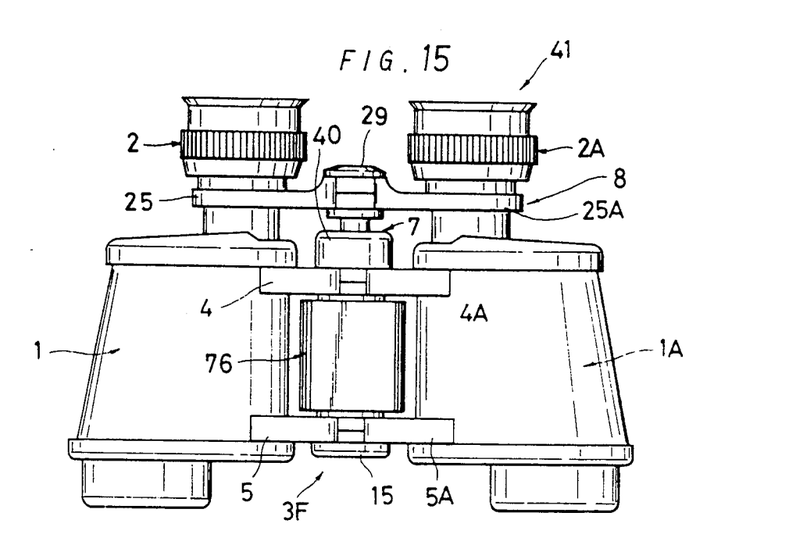
Figure 16:
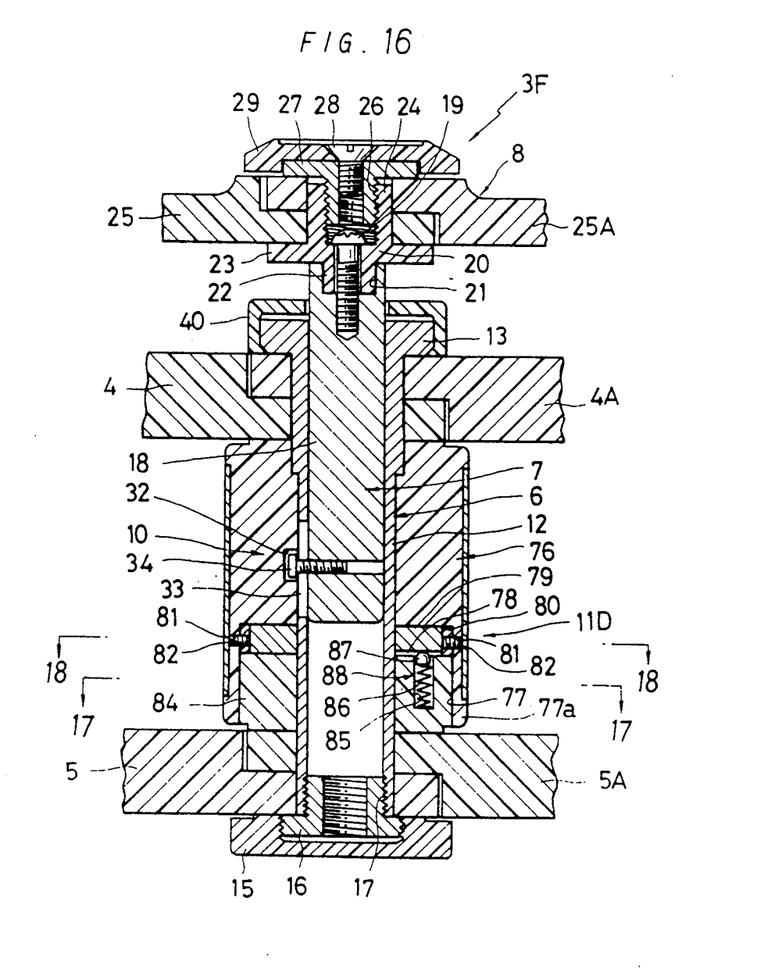
Figure 17:
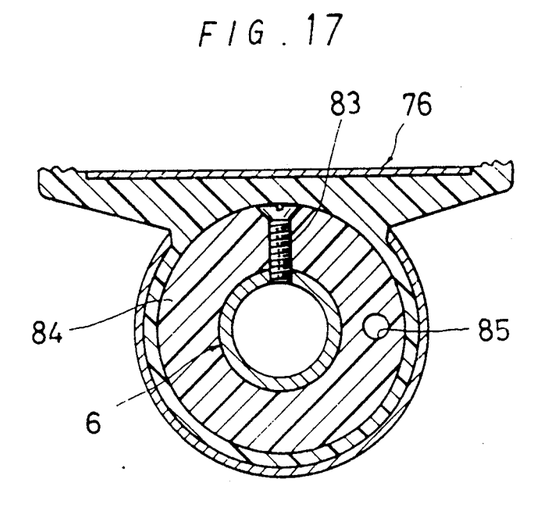
Figure 18:
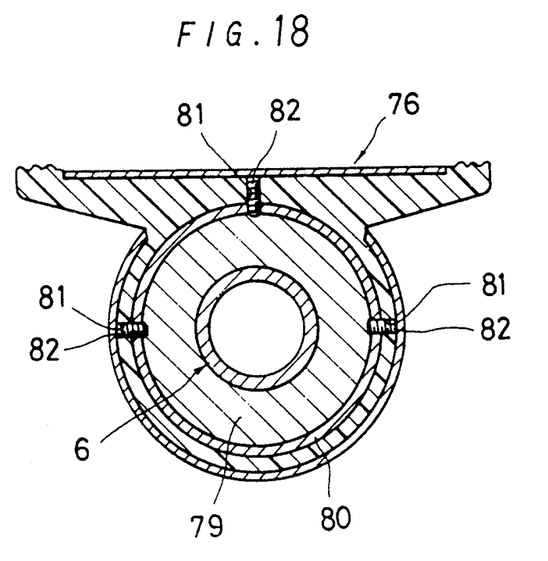

In the embodiment shown in FIGS. 13 and 14, the significant difference from the embodiments set forth above is that focusing linkage pole 74 is fixed to the inner end of the focusing rod 7, and that a focusing rod fixing apparatus 59A, as set forth immediately above, is installed using the central shaft 6. It will be appreciated that it is possible to obtain the same effect even in case of a visual regulatory apparatus 3E using the focusing rod fixing apparatus 59A arranged as described above.

It will be appreciated that it is possible to obtain the same effect even in case of the focusing rod 7 formed integrally with the focusing linkage pole 74.

In the embodiment shown in FIGS. 15–18, inclusive, the significant difference from the embodiment shown in FIGS. 1–4, inclusive, is that a lever-like adjusting piece 76 is installed around the central shaft 6 to move the focusing rod 7, in a click-stop apparatus 11D. This click-stop apparatus 11D comprises a click-ring 79 and an insert ring 80 which surrounds click ring 79, an infinity position regulatory screw 82, a second click ring 84, a coil-spring 86 in a blind bore 85 of a stopping unit 88. Click ring 79 has a concave groove 78 relative to the stopping piece 88 which is rotatable in an opening 77 formed in one end of the adjusting mechanism 76 surrounding the central shaft 6. A set screw 82 corresponding to a screw hole 81 formed in the outer wall of the adjusting mechanism 76 is provided to fix the click-ring at an optional set position. The second click ring 84 is fitted in the opening 77 and fixed in the lever-like adjusting mechanism which surrounds the central shaft 6 by a screw 83 shown in FIG. 17. A spring 86 is inserted in an insertion hole 85 formed in the adjusting mechanism 76 and a locking element 87 is attached to the spring 86 inserted in the insertion hole 85. The locking element is forced into the concave linear groove 78 in the click ring 79 by the coil spring 86.

The click stop apparatus 1 D van be used at a position when viewing an object at an infinite distance by a movement of the focusing rod 7 through rotation of the adjusting mechanism 76 where the ball 87 of the stop piece 88 is regulated to fall into the linear concave groove 78 of the click ring 79.

It will be appreciated that it is possible to obtain the same effect even in case of the focusing adjusting apparatus 3F having the adjusting mechanism 76 and the click stop apparatus 11D arranged as described.

THE EFFECTS OF THE INVENTION

As it is apparent from the above description, it is possible to obtain the effects of this invention as listed below:

1. This focus adjusting apparatus for a pair of binoculars comprises a tubular central shaft on which right and left telescopes are adjustably secured for width adjustment, and a focusing rod which is slidably installed within the central shaft for adjusting an eyepiece lens relative to the optical prisms, etc. for focusing on an object. The eyepiece lenses are supported by an outer end of the focusing rod and adjustable for width. The right and left eyepiece lenses are adjusted by movement of the focusing rod by an adjusting mechanism which adjusts the focusing rod and eyepiece lenses as the adjusting mechanism is rotated about an axis of the binoculars. A click-stop apparatus is provided which can automatically stop the focusing rod at a position for a focal length of infinity. Therefore, a use for infinity viewing can be easily done, and a change from infinity viewing can be prevented when the focusing rod 7 is click-stopped in place.

2. The focal adjustment and click stopping is relatively easy for the reasons described in the above item 1 and is possible to be carried out.

3. As it can be used in the same manner as before for the reason described in the above item 1, the treatment is also easy.

4. In the invention described herein, it is possible to obtain the same effects as described in the above items 1–3 inclusive.

5. In the invention described herein, the focusing rod can be fixed at an optional position by the focusing adjustment apparatus and it is possible to use for adjustment at an optional focal length of infinity.

What is claimed is:

1. A focal-length adjusting mechanism for binoculars which comprises, a tubular central shaft (6), right and left telescopes (1, 1A) rotatably installed upon said tubular central shaft for a width adjustment, a focusing rod (7) axially movable within said tubular central shaft (6), an eyepiece lens width adjusting apparatus (20) secured on an outer end of said focusing rod, said eyepiece lens width adjusting apparatus including arms (25) and (25A) which are rotatable at one end relative to said outer end of said focusing rod, said arm 25 being connected at its other end to a right eyepiece lens and said arm 25A being connected at its other end to a left eyepiece lens, said right and left eyepiece lenses being movable with said focusing rod, a rotatable adjusting mechanism (9) secured relative to said focusing rod for adjustment of said focusing rod and said right and left eyepiece lenses, and an apparatus which can automatically click-stop said focusing rod at a focal length of infinity.

2. A focal-length adjusting mechanism for binoculars as described in claim 1 in which said right and left telescopes are rotatably installed for rotation about said central shaft by spaced support pieces (4, 4A) and (5, 5A), said adjusting mechanism (9) is secured between said spaced support pieces and rotatable about said central shaft (6), a linear slot (33) in said central shaft, a spiral groove (32) in an inner wall of said adjusting mechanism, a radial aperture in said focusing rod (7) in radial alignment with said slot in said central shaft, a pin which extends into said aperture through said slot, said pin having a head (34) which protrudes into said spiral groove in said inner wall of said adjusting mechanism (9), whereby said focusing rod is moved axially within said central shaft as said adjusting mechanism is rotated about said central shaft.

3. A focal-length adjusting mechanism for binoculars as described in claim 2, in which said click-stop apparatus comprises a concave, annular groove formed in an outer end of said focusing rod, a click-ring having an annular groove in an inner wall thereof, means for securing said click ring relative to said outer end of said focussing rod, a stopping piece inserted in said groove in said inner wall of said click-ring whereby said focusing rod can be stopped by said stopping piece at a position for a focal length of infinity.

4. A focal-length adjusting mechanism for binoculars as described in claim 1, in which said click-stop apparatus comprises a concave, annular groove formed in an outer end of said focusing rod, a click-ring having an annular groove in an inner wall thereof, means for securing said click ring relative to said outer end of said focussing rod, a stopping piece relative in said groove in said inner wall of said click-ring whereby said focusing rod can be stopped by said stopping piece at a position for a focal length of infinity.

5. A focal-length adjusting mechanism for binoculars as described in claim 4 in which said click-stop apparatus comprises a V-like concave groove formed in an outer end of said focusing rod and a focusing rod stopping piece for insertion into said V-like concave groove at a focal length of infinity by movement of said focusing rod relative to said click-stop apparatus.

6. A focal-length adjusting mechanism for binoculars as described in claim 1 in which said click-stop apparatus comprises a V-like concave groove formed in an outer end of said focusing rod and a focusing rod stopping piece for insertion into said V-like concave groove at a focal length of infinity by movement of said focusing rod relative to said click-stop apparatus.

7. A focal-length adjusting mechanism for binoculars as described in claim 1 in which an outer end of said central shaft includes a radial flange (13), a V-like concave, annular groove formed in an outer end of said focusing rod (7), said click-stop apparatus being assembled relative to said annular flange (13), said click-stop apparatus including a restricted ring secured to said flange, and a stopping piece related to said restricted ring for insertion into said V-like concave annular groove at a position in which a focal length is at infinity.

8. A focal-length adjusting mechanism for binoculars which comprises a tubular central shaft, right and left telescopes rotatably secured to said tubular central shaft, a focusing rod (7) which is axially shiftable relative to said tubular central shaft (6), an eyepiece lens supporting apparatus secured to an outer end of said focusing rod, means for supporting right and left eyepiece lenses (2, 2A), said right and left eyepiece supporting means including oppositely directed arms (25, 25A), said oppositely directed arms being rotatably connected at one end thereof to said eyepiece lens supporting apparatus for width adjustment of said lenses, and each of said oppositely directed arms are connected at their opposite ends to said right and left eyepiece lenses, respectively, said focusing rod being rotatable for axial movement of said eyepiece lenses, a focusing rod adjusting mechanism (9) which is rotatably installed around an outer wall of said tubular central shaft, an adjusting apparatus (10) operative by rotation of said focusing rod adjusting mechanism for axially moving said focusing rod, a click-stop apparatus which can automatically click-stop said focusing rod in a position of an infinity focal length of said eyepiece lenses.

9. A focal-length adjusting mechanism for binoculars as described in claim 8 in which said click-stop apparatus is secured to an inner end of said focusing rod (7), said click-stop apparatus includes a restricted screw (57), a V-like annular groove (39) in an outer surface of said restricted screw, a stopping piece (35A) secured on an inner wall of said central shaft and a ring-spring (37) which drops into said annular groove at a focal length of infinity by movement of said focusing rod.

10. A focal-length adjusting mechanism for binoculars as described in claim 9 in which said focusing rod adjusting mechanism includes threads (51) along an inner surface of said central shaft (6), a screw pipe (53) with threads (52) thereon that correspond with threads (50) on said central shaft, threads (54) on an inner surface of said screw pipe that engage threads (55) on an outer surface of said focusing rod, and a manipulating wheel (56) for rotating said screw pipe for adjustment of said focusing rod.

11. A focal-length adjusting mechanism for binoculars comprising a tubular central shaft to which right and left telescopes are rotatably installed for a width adjustment, a focusing rod within said tubular central shaft for axial movement therein, an eyepiece lens supporting apparatus secured to an outer end of said focusing rod, said eyepiece lens supporting apparatus including oppositely disposed arms (25, 25A), one end of each of said arms being rotatable about a bearing tubular part (24), an opposite end of each of said arms being secured to right and left eyepiece lenses, respectively, for permitting a width adjustment of said eyepiece lenses, an adjusting mechanism which is rotatably installed about an outer wall of said central shaft, an adjusting apparatus between said adjusting mechanism and said focusing rod which moves said focusing rod axially by rotation of said adjusting mechanism, means for stopping said focusing rod in a position for a focal length at infinity, said means for stopping said focusing rod including a stopping ring holding piece (61), a stop ring (69), a spacing between said stop ring (69) and said focusing rod, a ring spring in said spacing which may inhibit a movement of the focusing rod, a non-slip rubber sheet surrounding a portion of said focusing rod juxtaposed said ring spring, means for adjusting said focusing rod axially and for applying a force on said ring spring to force said ring spring against said non-slip rubber sheet to position said focusing rod at a position of a focal length of infinity.

12. A focal length adjusting mechanism for binoculars as described in claim 11 in which said means for stopping said focusing rod at a position for a focal length of infinity is secured about an outer end of said focusing rod.

13. A focal-length adjusting mechanism for binoculars as set forth in claim 11 in which said means for stopping said focusing rod at a position for a focal length at infinity is secured to an inner end of said focusing rod.

* * * * *